(12) United States Patent
Marko

(10) Patent No.: US 7,451,943 B2
(45) Date of Patent: Nov. 18, 2008

(54) MARKING LIQUID METHOD OF PREPARATION AND PRODUCT PRODUCED THEREBY

(75) Inventor: Herbert Lee Marko, Maylands (AU)

(73) Assignee: Research Laboratories of Australia Pty Ltd., South Australia (AU)

( * ) Notice: Subject to any disclaimer, the term of this patent is extended or adjusted under 35 U.S.C. 154(b) by 182 days.

(21) Appl. No.: 10/568,570

(22) PCT Filed: Sep. 14, 2004

(86) PCT No.: PCT/AU2004/001241

§ 371 (c)(1),
(2), (4) Date: Feb. 16, 2006

(87) PCT Pub. No.: WO2005/026845

PCT Pub. Date: Mar. 24, 2005

(65) Prior Publication Data

US 2006/0276564 A1    Dec. 7, 2006

(30) Foreign Application Priority Data

Sep. 18, 2003   (AU) .............................. 2003905081

(51) Int. Cl.
*B02C 19/00*   (2006.01)

(52) U.S. Cl. ..................... 241/16; 241/21; 241/23; 241/29

(58) Field of Classification Search ................... 241/21, 241/29, 23, 16
See application file for complete search history.

(56) References Cited

U.S. PATENT DOCUMENTS

| | | | | |
|---|---|---|---|---|
| 4,631,244 | A * | 12/1986 | Mitchell | 430/137.19 |
| 5,449,583 | A * | 9/1995 | Murofushi et al. | 430/137.18 |
| 6,287,741 | B1 * | 9/2001 | Marko | 430/115 |
| 6,936,392 | B2 * | 8/2005 | Sato | 430/109.3 |

* cited by examiner

*Primary Examiner*—Mark Rosenbaum
(74) *Attorney, Agent, or Firm*—Klauber & Jackson LLC

(57) ABSTRACT

A method of preparation of a liquid electrostatographic toner or liquid ink jet ink which includes the steps of heating a marking particle mix of particles of a resin and a colourant blend in a carrier liquid to a temperature between about the first softening point of the resin and about the second softening point of the resin, maintaining the temperature of the heated marking particle mix for a selected period of time, cooling the marking particle mix to room temperature, and mixing the marking particle mix with high shear. The particle mix can be produced by coarse grinding in a ball mill. The resultant toner or ink has an improved Newtonian like flow behaviour, improved electrical properties, reduced sedimentation and agglomeration and significantly improved optical density and reduced background. The invention also includes toners and inks produced by the method.

20 Claims, 8 Drawing Sheets

EXAMPLE 1 - NO TREATMENT

EXAMPLE 2 - CONVECTION TREATMENT

EXAMPLE 2 - MICROWAVE TREATMENT

MARKING LIQUID METHOD OF PREPARATION AND PRODUCT PRODUCED THEREBY

CROSS REFERENCE TO RELATED APPLICATIONS

The present application is a National Stage Application claiming the priority of co-pending PCT Application No. PCT/AU2004/001241 filed Sep. 14, 2004, which in turn, claims priority from Australian Provisional Patent Application No. 2003905081 filed Sep. 18, 2003. Applicants claim the benefits of 35 U.S.C. §120 as to the PCT application and priority under 35 U.S.C. §119 as to the said Australian application, and the entire disclosures of both applications are incorporated herein by reference in their entireties.

FIELD OF THE INVENTION

This invention relates to a method of preparation of marking liquids for use in printers, including liquid developers and ink jet inks.

BACKGROUND OF THE INVENTION

A non-impact printing process can be simply defined as a process which uses an electronic, electric, or optical means to produce characters as opposed to a mechanical means. Of the non-impact printing processes, there is a group of printing methods that use electrostatic techniques. Electrostatic printing can be defined as those methods which use the interaction of electrostatically charged marking particles and an electric field to control the deposition of the marking particles onto a substrate, and encompasses processes generally known as electrographic, electrophotographic, or electrostatographic printing, as well as electrostatic ink jet printing.

Electrostatography can be a term used to describe the various non-impact printing processes which involve the creation of a visible image by the attraction of charged imaging particles or marking particles to charged sites present on a substrate. Such charged sites, forming what is usually termed a latent image, can be transiently supported on photoconductors or pure dielectrics and may be rendered visible in situ or be transferred to another substrate to be developed in that location. Additionally such charged sites may be the reflection of those structured charges existing within a permanently polarised material as in the case with ferroelectrics or other electrets.

In electrostatography the imaging particles, generally known as toner, can be of the dry type or of the liquid type. Dry powder toners have many disadvantages. For example the performance of dry powder toners is very susceptible to environmental conditions, influencing, for example, charge stability, and therefore giving rise to variable image performance. Also, the large particle size of dry powder toners is a major contributing factor in not allowing the achievement of highly resolved developed images. For high speed, long run printing, cost per page is a principal consideration. In particular, the cost of fusing the image to paper or any other desired substrate significantly contributes to the running costs of such a printer. Other objections are related to the problem of dusting. Dust or fine or small particles of toner are prone to escape from the developer, and these deposit onto any surface both within and outside the printing device, causing mechanical failures within the device and environmental problems outside the device. This problem becomes severe when such printing devices are run at high speed. Other disadvantages include cost of the general maintenance of the printer and cost of the dry powder toner.

It is known that latent electrostatic images can be developed with marking particles dispersed in insulating or non-polar liquids. These dispersed materials are known as liquid toners or liquid developers. Liquid toner development systems are generally capable of very high image resolution because the toner particles can safely be much smaller, normally in the range of 0.5 to 3 μm, than dry toner particles which are normally in the range of 7 to 10 μm. Liquid toner development systems show impressive gray scale image density response to variations in image charge and achieve high levels of image density using small amounts of liquid developer. Additionally, the systems are usually inexpensive to manufacture and are very reliable, furthermore the liquid toners for these systems are operationally and chemically stable thus exhibiting a particularly long shelf-life.

Ink jet printing is a non-impact printing process that does not involve a latent image; it is a direct printing system. It is usual for an ink to be fed through a nozzle. The droplets may be produced from the nozzle either continuously in which case the method is termed continuous printing or they may be produced individually as required in which case the method is termed drop on demand printing. In continuous printing an ink is delivered through the nozzle at high pressure and the nozzle is perturbed at a substantially constant frequency which results in a stream of droplets of constant size. By applying charge to the droplets and using an electric field external to the nozzle selected droplets may be deflected in their passage to the recording surface in response to a signal effecting the electric field whereby forming a pattern on the recording surface in response to the control signal. Drop on demand printing operates by producing local pulses in the liquid in the vicinity of a small nozzle which results in a droplet of liquid being ejected from the nozzle.

In either type of jet printing the colouring material is a soluble dye combined with binders to render the printed image more permanent. The disadvantage of soluble dyes is that the printed image density is not high enough in many applications and that the dyes fade under exposure in the environment. A further disadvantage with soluble dye materials is that the quality of the printed image is dependent on the properties of the recording surface. Pigmented inks are known to produce higher density images than soluble dyes and are also more permanent. Pigments may also be used in jet printers but the production of a dense image requires a high concentration of pigment material in a liquid carrier. The high concentration of pigment material affects the droplet break-up in continuous printers and results in less uniform printing. Drop on demand printers do not have a high continuous pressure and the droplet generation is strongly dependent on local conditions in the nozzle, therefore the presence of pigments can block the nozzle or otherwise modify the local nozzle conditions or block the nozzle such that droplets are not correctly ejected.

Electrostatic ink jet can be characterised by droplets being drawn from an orifice under the influence of an electrostatic field. This field acting between a valving electrode and the orifice, attracts free charges within the ink to its surface such that a droplet is produced when the electrostatic pull exceeds the surface tension of the ink. As this technique relies on attraction of free charges, it therefore requires that the ink be conductive.

A new electrostatic ink jet printing technology has been described in U.S. Pat. No. 6,260,954 to Lima-Marques. This process provides a means of producing variable sized droplets that contain a high concentration of particulate material. Specific advantages conveyed by this process include the ability to form droplets as small as a few micrometers while still using pigments as the colorant material. This is because the size of the droplets are controlled primarily by the voltage on an ejection point plus the ability of the particles to be charged. Also the colorant material is significantly concentrated in the ejected droplets. Therefore high resolution and high density images based on light and water resistant pigments can be produced.

It will be understood by those skilled in the above described non-impact printing art that the operational requirements for an effective liquid toner or liquid developer and that of an ink jet ink, in particular an electrostatic ink jet ink, can be significantly different. For the purpose of this specification and invention, however, the usage of the term marking liquids will be deemed to mean both liquid developers and liquid ink jet inks and in many instances, as would be understood by those skilled in the art, specific references to liquid developers may also be applicable to liquid ink jet inks, in particular to electrostatic ink jet inks.

In general, the process of production of electrostatic marking liquids commences with a resin or a resin system which can contain a resin or a combination of resins and which may also contain a colourant, which can be ground, extruded from a suitable mixing machine or otherwise combined by other techniques known to the art, including means of producing a Masterbatch such as for example a twin roll mill. Additionally included in the resin system there can be added dispersing resins, plasticisers or varnishes, as is generally known in the art.

Additionally, charge directing agents are usually included in the marking liquids to control the polarity and charge to mass ratio of the toner particles. The colourant can be a dye which is soluble in the resin or a pigment comprising of colourant particles which are not soluble in the resin. The resin system and colourant are then milled in a carrier liquid in which neither the resin nor the colourant is soluble, to produce a marking liquid with very fine marking particles distributed in it.

Liquid developers have generally utilized low viscosity liquids and low concentration of the solids content, that is, of marking particles. These traditional toners and associated process systems may be termed low viscosity toner or LVT systems. Generally, LVT systems utilise toners with low viscosities, typically 1 to 3 mPa·s. and low volumes of solids, typically 0.5 to 2% by weight. Maintaining a uniform dispersion of the marking particles can be difficult in a low viscosity toner system. The marking particles have a tendency to drift and settle in the carrier liquid. Furthermore, low volume of solids in the toner increases the amount of toner required to develop a given latent image. More toner will have to be transferred to the photoconductor in order to provide sufficient marking particles for a desired image density.

To overcome these and other known problems that can be associated with LVT systems, highly concentrated liquid toner development systems utilising toner concentrations of up to 60% by weight and viscosities of up to 10,000 mPa·s, and utilizing thin films, typically 1 to 40 μm, of the highly concentrated and viscous liquid toner have been disclosed. This system of developing electrostatic latent images with these viscous and highly concentrated liquid toner systems may be termed high viscosity toner or HVT systems. Examples of such liquid toners are disclosed in commonly assigned U.S. Pat. No. 6,287,741 to Marko, the disclosure of which is totally incorporated herein by reference. Examples of high viscosity, high concentration liquid developing methods and apparatus are disclosed in commonly assigned U.S. Pat. No. 6,137,976 to Itaya et al. and U.S. Pat. No. 6,167,225 to Sasaki et al., the disclosures of which are totally incorporated herein by reference.

Many such hitherto produced marking liquids have been found to have rheologies which can have non-Newtonian flow with applied shear and hence may not have ideal flow characteristics suitable under all conditions for their ultimate intended use. Particle size distribution of the marking particles of so produced marking liquids has also been found to be variable. Other possible problems encountered can include poor dispersion stability, variable electrical characteristics and generally variable print performance.

It is the object of this invention to provide a process for producing these marking liquids which will overcome these problems by providing an alternative ink or toner preparation method, or a post-production method to improve the performance of prior art marking liquids and a marking liquid so produced.

BRIEF DESCRIPTION OF THE INVENTION

In one form the invention is said to reside in a method of preparation of a liquid electrostatographic toner or liquid ink jet ink, the method including the steps of,
a) preparing a resin system comprising a resin or resins with optionally a colourant and coarse grinding the resin system,
b) milling the coarse ground resin system with a carrier liquid to produce a liquid marking particle mix,
c) heating the marking particle mix to a temperature about or greater than the first softening point of the resin or resins of the marking particle mix,
d) maintaining the temperature of the heated marking particle mix for a selected period of time,
e) cooling the marking particle mix to room temperature, and
f) mixing the marking particle mix with high shear.

Preferably the marking particle mix is heated to a temperature of about or greater than about the first softening point of the resin system to less than about the second softening point of the resin system.

The selected period of time may be from several minutes to several days depending upon the type of heating applied and the method of applying that heat and the heating may be provided by convection, such as in an oven, conduction or radiation, such as microwave radiation.

The resin system can comprises 0 to 60% of colourant, 0 to 20% of plasticisers, and resin to 100%.

The step of milling the resin system and optional colourant particles can include milling with additives selected from one or both of the group comprising charge control agents and dispersion agents.

In a further form the invention is said to reside in a method of preparation of a liquid electrostatographic toner or liquid ink jet ink, the method including the steps of,
a) heating a marking particle mix including a carrier liquid and a resin system which is insoluble in the carrier liquid to a temperature at or about the first softening point of the resin system of the marking particle mix,
b) maintaining the temperature of the heated marking particle mix for a selected period of time,
c) cooling the marking particle mix to room temperature, and
d) mixing the marking particle mix with high shear.

The invention may also reside in a liquid electrostatographic toner or liquid ink jet ink prepared by the methods discussed above.

Such a liquid electrostatographic toner can comprise 1% to 60% marking particles by weight, 0 to 5% charge control agent, 0 to 20% dispersion agent, and carrier liquid to 100%.

In a further form the invention is said to reside in a method of preparation of a liquid electrostatographic toner or liquid ink jet ink including the steps of heating a marking particle mix of particles of a resin and a colourant blend in a carrier liquid to a temperature between about the first softening point of the resin to less than about the second softening point of the resin, maintaining the temperature of the heated marking particle mix for a selected period of time, cooling the marking particle mix to room temperature, and mixing the marking particle mix with high shear.

In a further form the invention is said to reside in a method of improving the rheology of a liquid electrostatographic toner or liquid ink jet ink including the steps of heating a marking particle mix of particles of a resin and a colourant blend in a carrier liquid to a temperature between about the first softening point of the resin to less than about the second softening point of the resin, maintaining the temperature of the heated marking particle mix for a selected period of time, cooling the marking particle mix to room temperature, and mixing the marking particle mix with high shear.

In a further form the invention is said to reside in a method of improving the physical and electrical properties of a liquid electrostatographic toner, the toner comprising particles of a resin and a colourant in a carrier liquid, the method including the steps of heating the toner to a temperature between about the first softening point of the resin to less than about the second softening point of the resin, maintaining the temperature of the toner for a selected period of time, cooling the toner to room temperature, and mixing the toner with high shear.

The first softening point is defined as the temperature where the macromolecular structure of the resin begins to relax. The second softening point is defined as the temperature where the resin begins to flow as it approaches its melting transition. The first and second softening points can be measured with a Thermal Mechanical Analyser (TMA). The first and second softening points from a TMA are often comparable to Tg (glass transition) and Tm (melting point) respectively.

BRIEF DESCRIPTION OF THE DRAWINGS

The above and other objects, features and advantages of the present invention will become more apparent from the following detailed description taken with the accompanying drawings in which.

DETAILED DESCRIPTION OF PREFERRED EMBODIMENTS OF THE INVENTION

Figure 1:
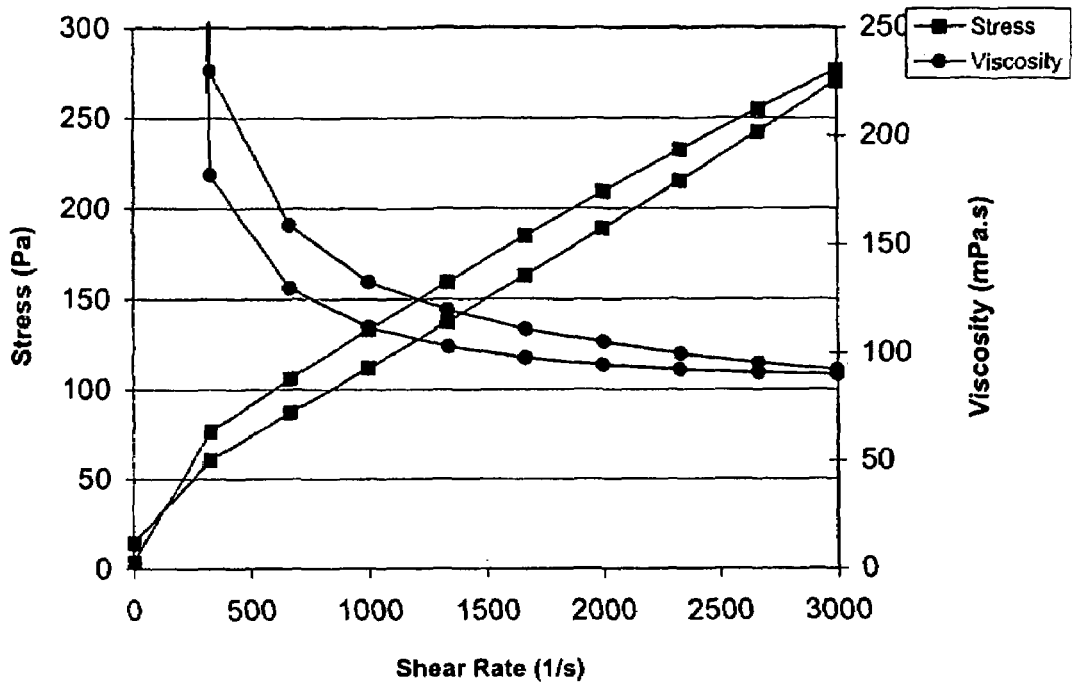
FIG. 1 is a graph illustrating the rheology of Example 1 with no treatment.

In this specification, the invention will be discussed particularly in relation to the use of the invention for the production of liquid toners, including so-called high viscosity high concentration liquid toners, for electrostatic printing applications. It would be understood by those skilled in the art that the methods described herein are also applicable to the production and processing of ink jet inks, including inks suitable for electrostatic type ink jet printers.

In general, a liquid developer or toner for electrostatography is prepared by dispersing an inorganic or organic colourant in a carrier liquid. The liquid developer should be stable, not only in terms of suspension stability, but also of electrical charge. As such numerous additional components can be additionally integrated into the developer to achieve liquid developers that exhibit reproducible high quality images.

In such developers, it has been recognised that certain properties of the carrier liquid are mandatory requirements for the effective functioning of a conventional electrostatographic liquid development process. The mandatory requirements include low electrical conductivity but other requirements have also become obvious, such as the need for low toxicity, increased fire safety, low solvent power, low odour etc. For these reasons, isoparaffinic-hydrocarbons such as the Isopar® range manufactured by Exxon Mobil, the Shellsol® range manufactured by Shell Chemical and the Soltrol® range manufactured by Chevron Phillips Chemical Company have become the industry standards for liquid toner carriers.

Other carrier liquids may be used, and these may also comprise a silicone fluid of straight chained configuration, a silicone fluid of cyclic configuration, a silicone fluid of branched configuration, or a combination thereof.

The carrier liquid may also comprise a mineral oil or white oil.

The carrier liquid may also comprise a vegetable oil. Representative examples of vegetable oils include soybean oil, cottonseed oil, safflower oil, sunflower oil, castor oil, linseed oil and olive oil.

The carrier liquid may also comprise a synthetic oil. Representative examples of synthetic oils include fatty acid esters obtained by the reaction between higher fatty acid and alcohol, and ester compounds obtained by the reaction between higher fatty acid and ethylene glycol or glycerine.

The carrier liquid may also comprise a polybutene, a synthetic hydrocarbon polymer made by the polymerisation of isobutene (also known as "isobutylene"). Another name for polybutene is polyisobutylene.

It would be understood by those skilled in the art that blends of the abovementioned carrier liquids or other suitable carrier liquids could be used in relation to this invention.

Colourants that are insoluble in the carrier liquid may be selected upon their particular proposed end use. Examples of marking particles include inorganic pigments such as iron oxide, silica, alumina, titanium dioxide, magnetic iron oxide, or organic pigments such as carbon black, phthalocyanine blue, alkali and reflex blue, phthalocyanine green, diarylide yellow, arylamide yellow, azo and diazo yellow, azo red, rubine toner, quinacridone red, basic dye complexes, lake red, or fluorescent pigments and dyestuffs such as basic dyes and spirit soluble dyes, or combinations thereof. Other materials, as would be understood by those skilled in the art, could be used as colourants.

As indicated above, the liquid developer or toner may also include an organic or inorganic insoluble marking particle and such a marking particle may be present in the range of 1 to 60% by weight.

The resin or combination of resins to make up the resin system may be selected from one or more of ethyl cellulose, oil modified alkyd resin, acrylic or methacrylic ester resin, polystyrene, silicone-acryl copolymer, silicone resin, silicone-(meth)acryl copolymer, block polymer or graft polymer, polyolefin copolymer, poly(vinyl chloride) resin, chlorinated polypropylene, polyamide resin, coumarone-indene resin, rosin-modified resin, and alkylphenol-modified xylene resin, synthetic polyesters; polypropylene or modified polypropylene; alkylated poly vinyl pyrrolidones; natural waxes such as montan wax, candelilla wax, sugar cane wax, beeswax, natural resins such as ester gum and hardened rosin; natural-resin-modified cured resins such as natural resin-modified maleic acid resins, natural resin-modified phenol resins, natural resin-modified polyester resins, natural resin-modified pentaerythritol resins, styrene acrylates and epoxy resins.

Other components such as plasticisers can also be incorporated, examples of which are sulfonamides, adipates, sebacates and phthalates.

Additionally to affect or enhance electrostatic charge on such dispersed particles additives known as charge directors or charge control agents may be included. Such materials can be metallic soaps, fatty acids, lecithin, organic phosphorus compounds, succinimides and sulphosuccinates.

The charge control agent may be present in a range of 0.01 to 5% by weight of the toner when used.

The liquid developer or toner may also include a dispersion agent which can be selected, for example, from the Solsperse® range of polymeric hyperdispersants including 13940 made by Avecia; amino-silicones including Finish® WR1101 made by Wacker Chemicals; polymeric oil additives including Plexol® made by Rohm and Haas; polymeric petroleum additives including FOA-2® made by Dupont; multi-functional pigment dispersion agents including Disperse Ayd 1® made by Elementis DCP Inc.

The dispersion agent may be incorporated into the liquid composition by techniques commonly employed in the manufacture of liquid compositions such as ball-jar milling, attritor milling, bead milling etc. Pre-mixing techniques involving blending the dispersion agent into the carrier liquid before the addition of marking particles and before the milling stage can also be used to incorporate the dispersion agent into the liquid developer formulation.

The dispersion agent may be present in a range of 0.1 to 20% by weight of the toner when used.

Examples of suitable liquid toner formulations include those disclosed in commonly assigned U.S. Pat. No. 5,591,557 to Lawson et al., U.S. Pat. No. 5,612,162 to Lawson et al., U.S. Pat. No. 6,174,640 to Lawson and U.S. Pat. No. 6,287,741 to Marko, the disclosures of which are totally incorporated herein by reference.

The Applicant has surprisingly found that liquid toners manufactured as in the abovementioned disclosures will exhibit an enhanced performance on all levels if the so produced liquid toner is post treated by heating the liquid toner to a temperature about or above the first softening point of the resin of the liquid marking particle mix, maintaining the temperature of the heated marking particle mix for a selected period of time, cooling the resin to room temperature, and mixing the liquid toner with high shear.

The Applicant has additionally found that liquid toner performance can be even further enhanced by matching the liquid toner resin system to the dispersing agent and carrier liquid. The heating process can then be optimised to the thermal characteristics of the resin system, and therefore produce a more effective post treatment result.

The selected heating period may be from several minutes to several days depending upon the type of heating applied and the method of applying that heat. Heating can be done by convection, such as in an oven, conduction or electromagnetic radiation, such as microwave radiation. Due to the different energies of these different heating systems the method chosen will determine the conditions required to achieve the desired results. In some instances, however, such as in a convection oven, it has been found that it is important that the liquid toner is evenly heated to the required temperature, and that no or minimal agitation takes place during the heating stage. The heating temperature can be dependent on the resin system used in the liquid toner formulation and the Applicant has found that it should be about or just above the first softening point of the resin or resins.

High shear mixing can be achieved with any commercially available high shear mixers. The Applicant has found that the degree of mixing required is dependent on the solid content of the formulation, that is, the higher the solids content of the liquid developer the higher the energy input requirement.

Although the exact process by which this method of preparation improves the desired characteristics of a liquid toner is not fully understood, the following explanation will be given but the Applicant is not bound to this explanation.

It is believed that during the heating stage when the resin is heated to about or just above its first softening point, the structure of the resin particles begins to relax as internal stresses are released as the resin begins to transit through its glassy state, and surface tension effects occur such that the morphology of the toner particles assumes a smoother shape.

The action of a suitable dispersing agent in the liquid toner prior to the treatment is useful at this point because it ensures that individual particles of resin and colourant remain separated from one another so as they do not agglomerate or stick together. The dispersing agent achieves this through its strong affinity for the toner particle causing it to form a protective layer around the particle and therefore providing an adequate barrier between neighbouring resin and colourant particles through steric hindrance forces and enabling the particle surface to relax and flow and thus become smoother.

It has been noted that after the heating and cooling stage, a weakly formed gel structure can often form which is believed to be due to possible weak attraction or interaction of dispersion agent species residing on the surface of one particle with that of another particle. This interaction is easily broken up by moderate shearing forces used during the high shear mixing stage of the process.

It has also been noted that liquid toners produced by the process of the present invention exhibit a more Newtonian like flow behaviour with very little or no yield viscosity, as can be see in FIG. 2-3, FIG. 5-6, FIG. 8-9, FIG. 11-12 and FIG. 14-15; even with high solid content formulations of up to 60% by weight solids but preferably in the range of 10-40% weight solids. There is also a significantly reduced high shear toner viscosity. This means that when the toners for instance are used in printing machines, the characteristic viscosity of the toner is less dependant on the speed of rollers and the like and hence has a more even and predictable action during use.

Smoothing of the toner particle surface results in a reduced surface area causing improved flow properties which can be related to the measured viscosity change with change in shear.

The Applicant has also found improved toner stability. Depending on the type of dispersion agent and resin system used, there can be an enhanced interaction during the heating stage of the process between the dispersion agent and the particle and/or the reaction of the functional groups of specific dispersion agent materials with epoxide groups of specific resin system to key the dispersion agents strongly to the surface of the toner particle resulting in improved toner dispersion stability.

Increased stability may also be achieved as a result of a reduced toner particle surface area such that the ratio of dispersion agent available per unit surface area of toner particle has substantially increased.

The Applicant has also noted improved toner electrical properties. Due to smoothing of the toner particle surface, reduced high shear viscosity and Newtonian like flow behaviour being achieved, the charge to mass ratio of the toner particles increases apparently due to higher adsorption of charging and dispersing species on the toner surface along with increased toner mobility to give improved electrical properties to the liquid developer.

The electrical characteristics of a liquid developer can be measured with a liquid toner characterization cell, of which apparatus details are disclosed in commonly assigned U.S. Pat. No. 6,613,209 to Ozerov, the disclosure of which is totally incorporated herein by reference.

The liquid toners prepared according to this present invention also exhibit improved print performance. Liquid toners prepared according to the present invention also show substantially increased optical density, decreased background staining, higher image resolution and improved toner management and handling characteristics. These toner handling and management characteristics include improved ability for recycling and replenishment of toners and the general flow of the toner within a printer.

This then generally describes the invention but to assist with understanding, reference will now be made to the accompanying non-limiting examples which show embodiments of the invention.

EXAMPLES

Example 1

An extrudate 1 was prepared with the following composition:

| | |
|---|---|
| Epikote 1001 | 61.5 g |
| Antaron V220 | 18.5 g |
| Irgalite Blue LGLD | 20 g |

The above components were blended together to form the extrudate 1 using, for example, a hot-melt extruder and allowed to cool. The extrudate 1 was then crushed to a coarse powder, ready for use in the example.

Epikote 1001 is an epoxy resin made by Shell Chemicals, Australia. Irgalite Blue LGLD is a CI Pigment Blue 15:3 made by Ciba-Geigy, Basel Switzerland. Antaron V220 is an alkylated polyvinylpyrrolidone made by GAF/ISP Chemicals, New Jersey U.S.A.

A marking liquid of the following composition was then prepared using the extrudate 1:

| | | |
|---|---|---|
| Extrudate 1 | | 125 g |
| Finish WR1101 | | 5 g |
| DC 200 Fluid | 10 cSt | 370 g |

Finish WR1101 is a dimethyl polysiloxane having aminoalkyl functional groups, made by Wacker Chemicals, Munich Germany. DC 200 10cSt Fluid is a silicone fluid made by Dow Corning, U.S.A.

Example 2

An extrudate 2 was prepared with the following composition:

| | |
|---|---|
| Epikote 1004 | 73 g |
| Jayflex UDP | 7 g |
| Irgalite Blue LGLD | 20 g |

The above components were blended together to form the extrudate 2 using, for example, a hot-melt extruder and allowed to cool. The extrudate 2 was then crushed to a coarse powder, ready for use in the example.

Epikote 1004 is an epoxy resin made by Shell Chemicals, Australia. Jayflex UDP is a phthalate plasticiser (undecyl dodecyl phthalate) made by Exxon Mobil.

A marking liquid of the following composition was then prepared using the extrudate 2:

| | | |
|---|---|---|
| Extrudate 2 | | 125 g |
| Finish WR1101 | | 5 g |
| DC 200 Fluid | 50 cSt | 370 g |

DC 200 50cSt Fluid is a silicone fluid made by Dow Corning, U.S.A.

Example 3

A marking liquid of the following composition was prepared:

| | |
|---|---|
| Solsperse 13940 | 10 g |
| Marcol 82 INH | 365 g |
| Epikote 1004 | 100 g |
| Irgalite Blue LGLD | 25 g |

Solsperse 13940 is a dispersing agent made by Avecia. Marcol 82 INH is a white-oil made by Exxon Mobil.

Example 4

An extrudate 3 was prepared with the following composition:

| | |
|---|---|
| Monarch Fluffy 435 | 25 g |
| Jayflex UDP | 6 g |
| Epikote 1004 | 69 g |

The above components were blended together to form the extrudate 3 using, for example, a hot-melt extruder and allowed to cool. The extrudate 3 was then crushed to a coarse powder, ready for use in the example.

Monarch Fluffy 435 is a carbon black, Pigment Black 7, manufactured by Cabot Corporation.

An ink jet ink of the following composition was then prepared using the extrudate 3:

| | |
|---|---|
| Extrudate 3 | 100 g |
| Solsperse 13940 | 20 g |
| 6% Zirconium Octoate | 25 g |
| Isopar G | 355 g |

6% Zirconium Octoate is a solution of zirconium octanoate in white spirits made by Exxon Mobil. Isopar G is an isoparaffinic solvent made by Exxon Mobil.

This Example 4 was treated with the present invention as a so produced concentrate. For imaging tests, the so treated concentrate was then diluted 1:5 with Isopar G prior to testing in the printing device.

Example 5

U.S. Patent Application 2003/0104304A1 to Nicholls, the disclosure of which is totally incorporated herein by reference, discloses prior art liquid developers in which the liquid carrier comprises or includes a polybutene. Example 2 of the above patent application was manufactured as disclosed in said application and then further treated using the present invention.

The so produced marking liquids of the above examples were prepared by adding the constituents into a ceramic ball jar containing spherical ceramic grinding media and milling for 4 days to prepare a resinous toner or ink, or as described in the relevant prior art.

It should be understood that the quantities of raw materials in the Examples 1 to 4 can be varied dependent on the liquid developer or ink characteristics required and the mode of operation of the electrostatic printer.

The thermal properties of the resin systems of the Examples are as follows:

| Example | First Softening Point | Second Softening Point |
|---|---|---|
| 1 | 50.9° C. | 87.2° C. |
| 2 | 45.5° C. | 79.3° C. |
| 3 | 61.5° C. | 106.8° C. |
| 4 | 50.2° C. | 82.8° C. |
| 5 | 44.6° C. | 80.7° C. |

The above results were measured using a Seiko Thermal Mechanical Analyser (TMA), Type TMA120C.

The marking liquid Examples were then divided into three batches. Two batches of each were further treated according to the present invention as follows:

A first batch of so produced marking liquid was placed in a suitable container and subjected to heating in an oven. The marking liquid was heated in the oven at a set temperature and maintained at that temperature for a period of 48 hours without any form of agitation.

| Example | Oven Temperature |
|---|---|
| 1 | 60° C. |
| 2 | 50° C. |
| 3 | 70° C. |
| 4 | 60° C. |
| 5 | 50° C. |

Heating of the marking liquids about or above the first softening point of the resin system of the marking particle mix, causes the structure of the resin particles to begin to relax as internal stresses are released and surface tension effects occur such that the morphology of the marking particles assumes a smoother shape. After the 48 hour heating period, the marking liquids were taken out of the oven and allowed to cool to room temperature. Once the marking liquids are at or near room temperature the marking liquids are then mixed with high shear. This was achieved with an IKA-Werk Type SD40 Super Dispax, controlled with an IKA-Werk DS1 Controller, both manufactured by Jankel & Kunkel GmbH. The toners are subjected to high shear mixing with one pass through the above mixer at a dial speed setting of 50 and a rotor-stator gap dial setting of 1.

A second batch of each Example was treated using radiation as the heating mechanism for post treatment and was prepared by heating the batches with microwaves. A microwave generator at 2450 MHz with variable power capacity was used to heat the batches. The batches, consisting of 100 grams of the marking liquid were heated in a Pyrex® glass cylinder to the required temperature for 1 minute, and then maintained at the required temperature for 10 minutes. The table below illustrates the approximate microwave power settings used for heating and maintaining the batches at temperature.

| Example | Temperature | Microwave Power (1 minute) | Microwave Power (10 minutes) |
|---|---|---|---|
| 1 | 60° C. | 250 W | 40 W |
| 2 | 50° C. | 180 W | 35 W |
| 3 | 70° C. | 315 W | 45 W |
| 4 | 60° C. | 250 W | 40 W |
| 5 | 50° C. | 180 W | 35 W |

The batches were then allowed to cool to room temperature and then mixed with high shear as previously described.

The physical properties of particle size, rheology, mobility and morphology of the marking liquid particle for the microwave heat treated batches were similar to that of the oven heated treated batches, where particle size was reduced, rheology became more Newtonian, mobility was increased and particle morphology was much smoother.

The batches both before and after the treatment by the invention were then examined for various physical properties and for print quality by producing print samples. The rheological data for stress versus shear rate and viscosity versus shear rate are shown in FIGS. 1 to 15.

Physical Properties

Particle Size.

Characteristics measured were D[4,3] which indicates the equivalent spherical volume diameter mean and this value is biased toward larger particles since volume is a function of the cube of the particle radius; and D[v,0.5] which indicates the volume 50% value of the distribution. This differs from D[4,3] if the volume distribution is skewed.

Results were as follows:

|  | No Treatment | Convection Treatment | Microwave Treatment |
| --- | --- | --- | --- |
| Example 1 | | | |
| D[4, 3] | 1.27 μm | 1.10 μm | 1.18 μm |
| D[v, 0.5] | 1.06 μm. | 0.93 μm | 0.98 μm |
| Example 2 | | | |
| D[4, 3] | 1.95 μm | 1.79 μm | 1.80 μm |
| D[v, 0.5] | 1.51 μm. | 1.44 μm | 1.47 μm |
| Example 3 | | | |
| D[4, 3] | 1.42 μm | 1.35 μm | 1.27 μm |
| D[v, 0.5] | 0.97 μm. | 0.90 μm | 0.89 μm |
| Example 4 | | | |
| D[4, 3] | 0.81 μm | 0.69 μm | 0.70 μm |
| D[v, 0.5] | 0.58 μm. | 0.52 μm | 0.53 μm |
| Example 5 | | | |
| D[4, 3] | 1.27 μm | 1.10 μm | 1.18 μm |
| D[v, 0.5] | 1.06 μm. | 0.93 μm | 0.98 μm |

These results show a significant drop in particle size and a narrower distribution. Particle size distribution was measured using a Malvern Mastersizer.

Viscosity

Figure 2:
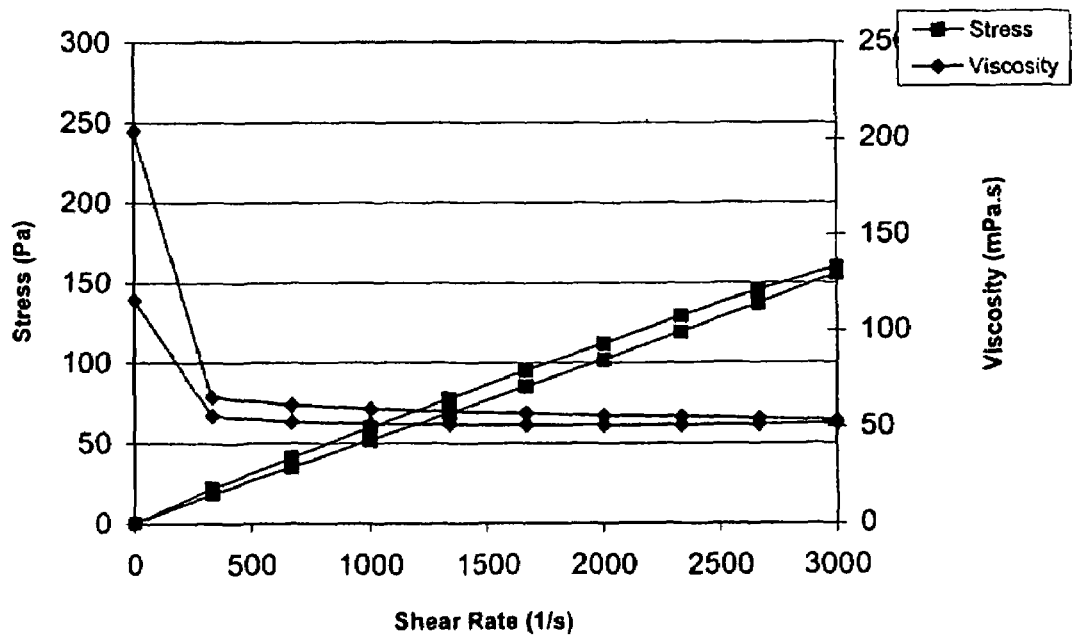
FIG. 2 is a graph illustrating the rheology of Example 1 after convection treatment.
Figure 3:
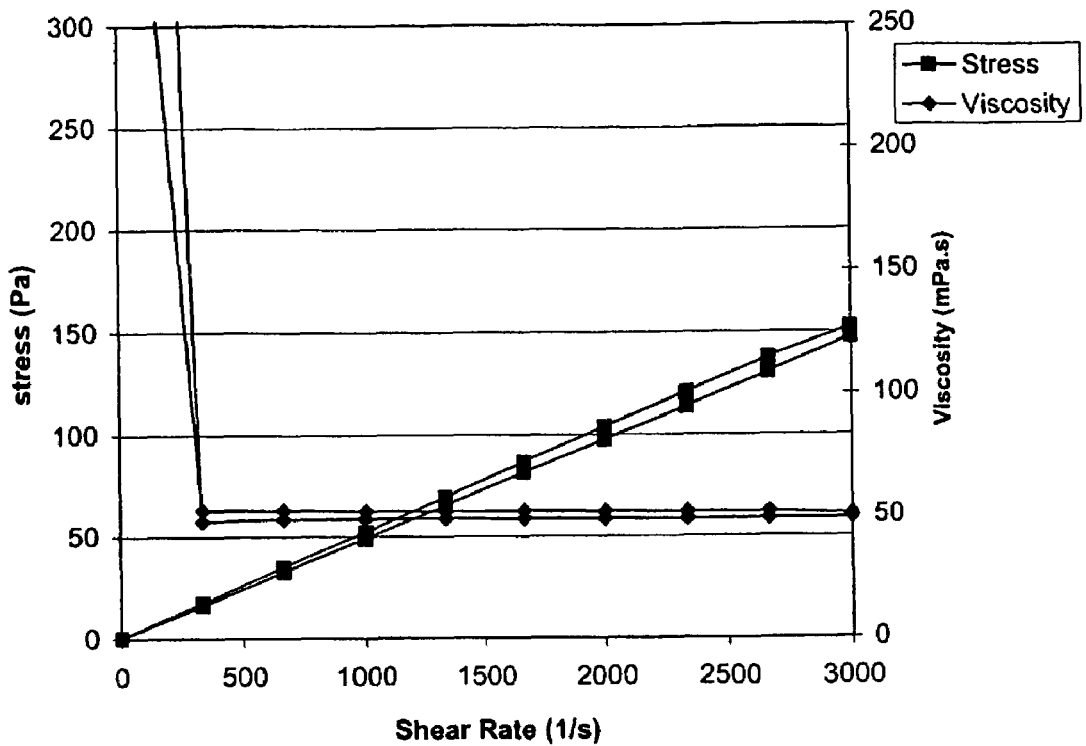
FIG. 3 is a graph illustrating the rheology of Example 1 after microwave treatment.

Viscosities were measured using a HAAKE RheoStress RS100. All measurements were taken at 20° C. FIG. 1 of the attached drawings shows Example 1 before treatment, FIG. 2 shows Example 1 after convection treatment and FIG. 3 shows Example 1 after microwave treatment.

FIG. 1 illustrates that prior to the treatment, the toner was non-Newtonian and exhibited shear thinning, with a high shear viscosity of 92.1 mPa·s. FIG. 2 illustrates the same toner after the convection treatment. It now exhibits a significant reduction in non-Newtonian flow behaviour or yield viscosity, with a high shear viscosity of 53.2 mPa·s. FIG. 3 illustrates the same toner after microwave treatment. It now also exhibits a significant reduction in non-Newtonian flow behaviour or yield viscosity, with a high shear viscosity of 50.7 mPa·s.

Figure 4:
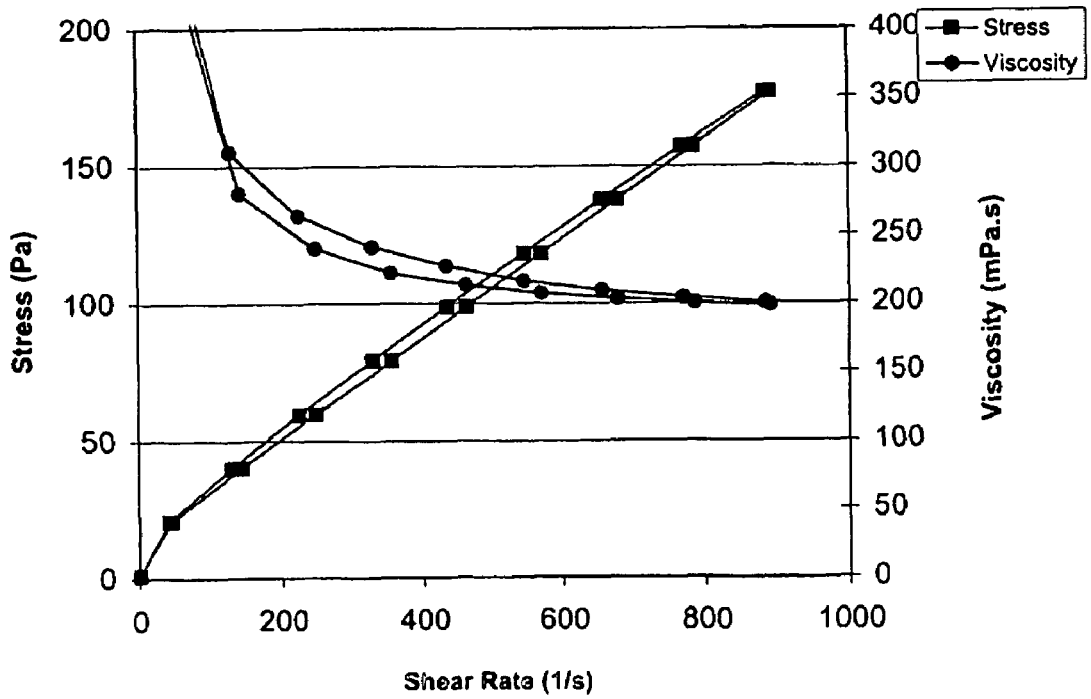
FIG. 4 is a graph illustrating the rheology of Example 2 with no treatment.
Figure 5:
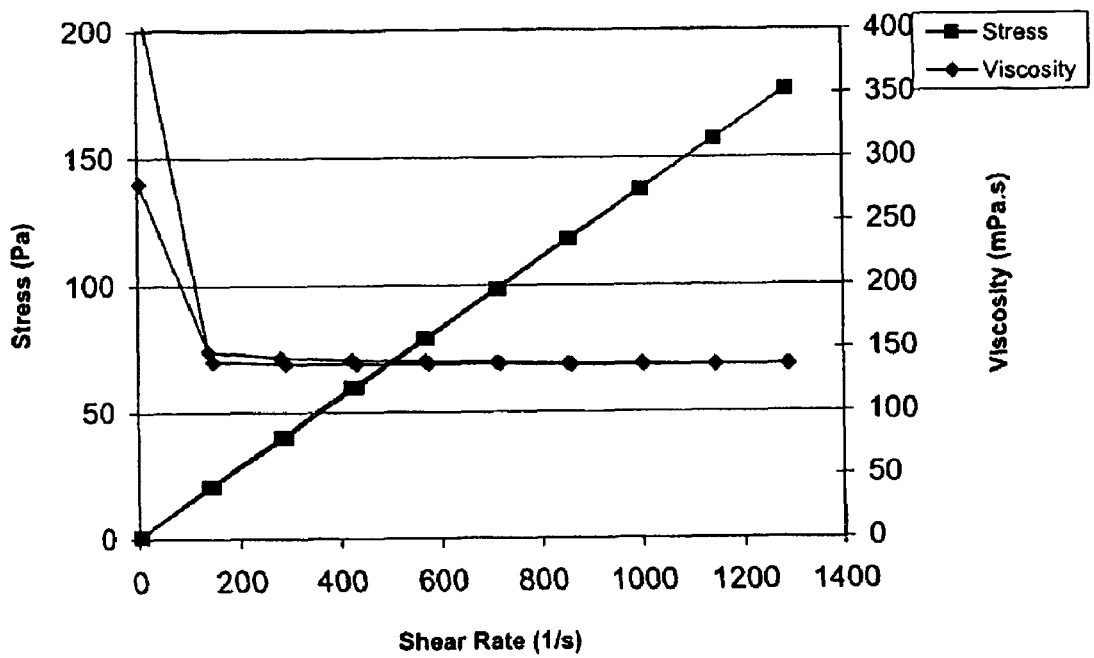
FIG. 5 is a graph illustrating the rheology of Example 2 after convection treatment.

FIG. 4 of the attached drawings shows Example 2 before treatment, FIG. 5 shows

Figure 6:
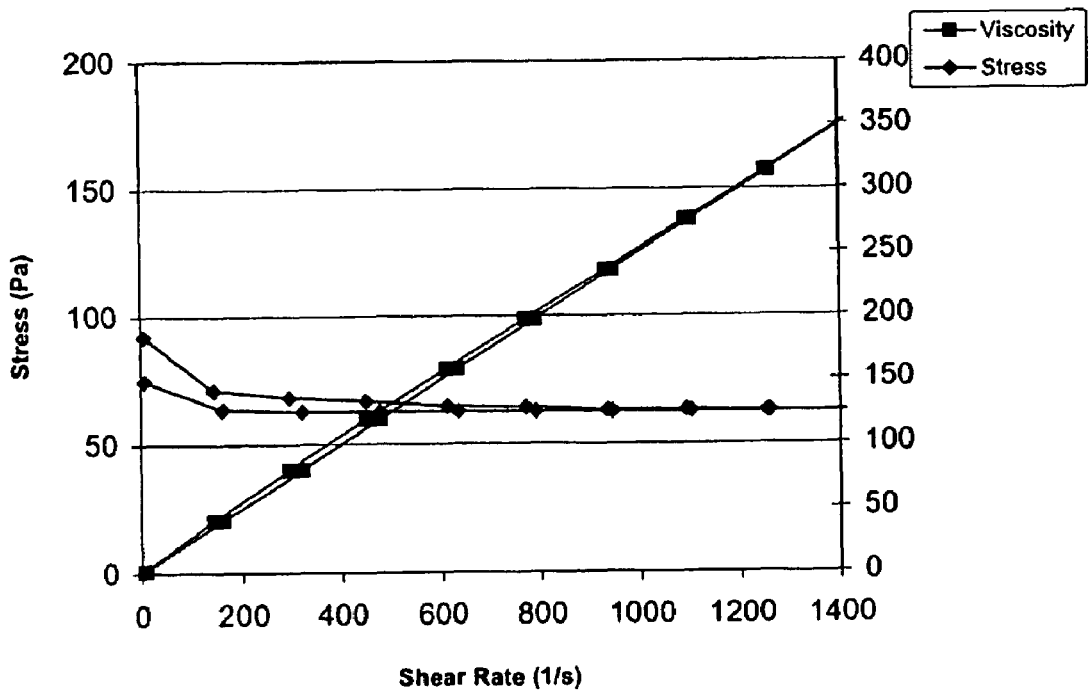
FIG. 6 is a graph illustrating the rheology of Example 2 after microwave treatment.

Example 2 after convection treatment and FIG. 6 shows Example 2 after microwave treatment.

FIG. 4 illustrates that prior to the convection treatment, the toner was non-Newtonian and exhibited shear thinning, with a high shear viscosity of 200 mPas. FIG. 5 illustrates the same toner after the convection treatment. It now exhibits a significant reduction in non-Newtonian flow behaviour or yield viscosity, with a high shear viscosity of 137 mPas. FIG. 6 illustrates the same toner after microwave heat treatment. It now also exhibits a significant reduction in non-Newtonian behaviour or yield viscosity, with a high shear viscosity of 125 mPa·s.

Figure 7:
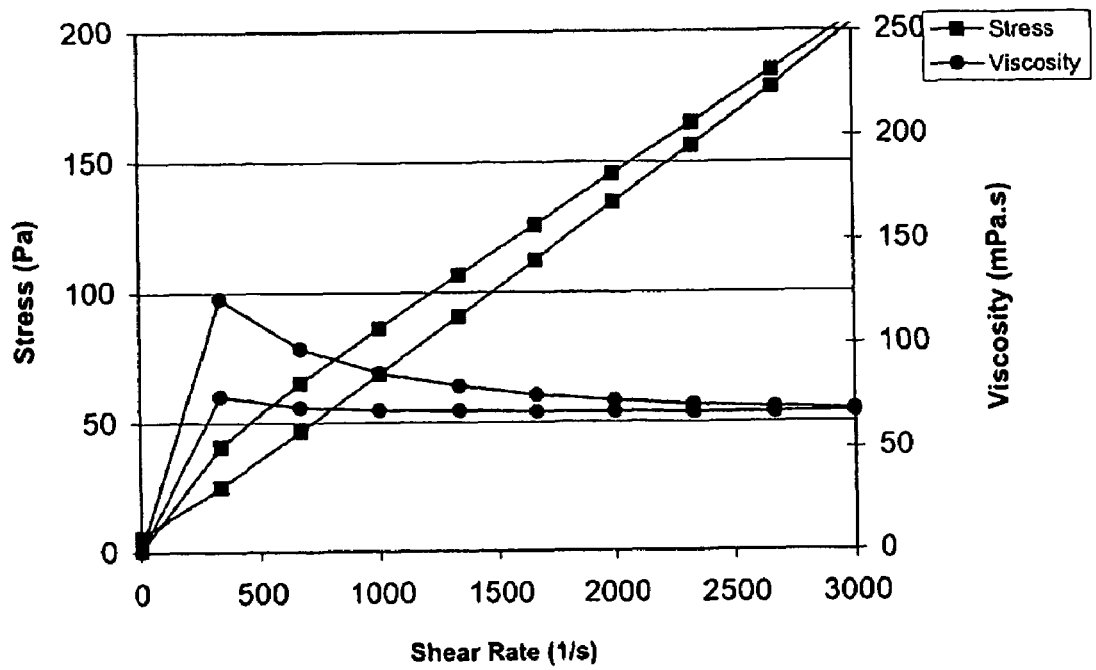
FIG. 7 is a graph illustrating the rheology of Example 3 with no treatment.
Figure 8:
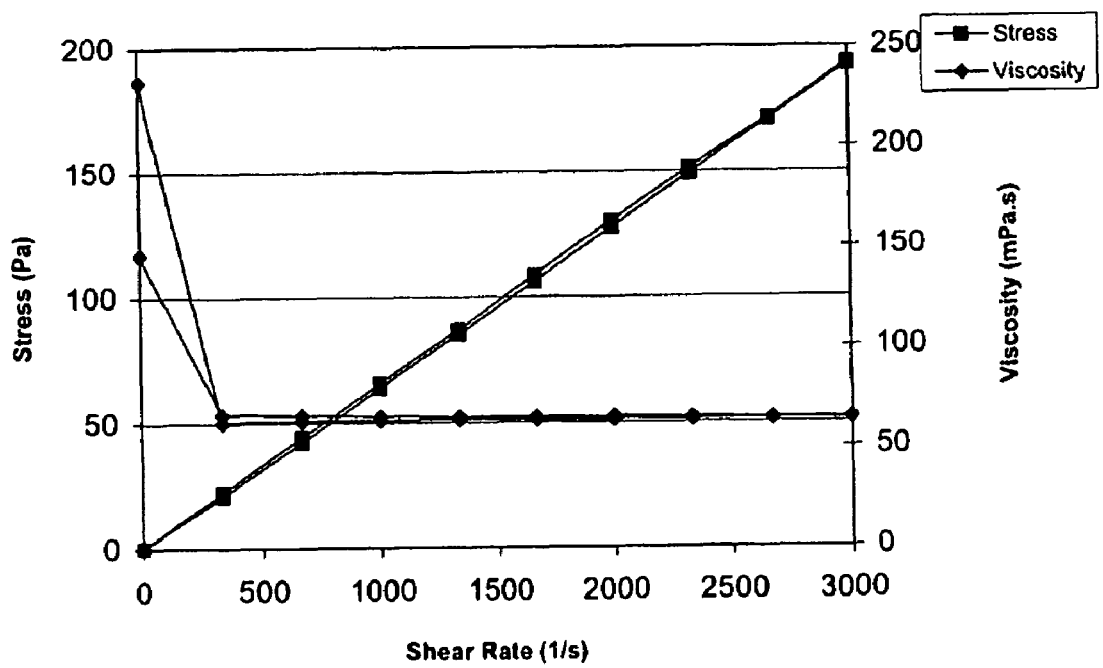
FIG. 8 is a graph illustrating the rheology of Example 3 after convection treatment.
Figure 9:
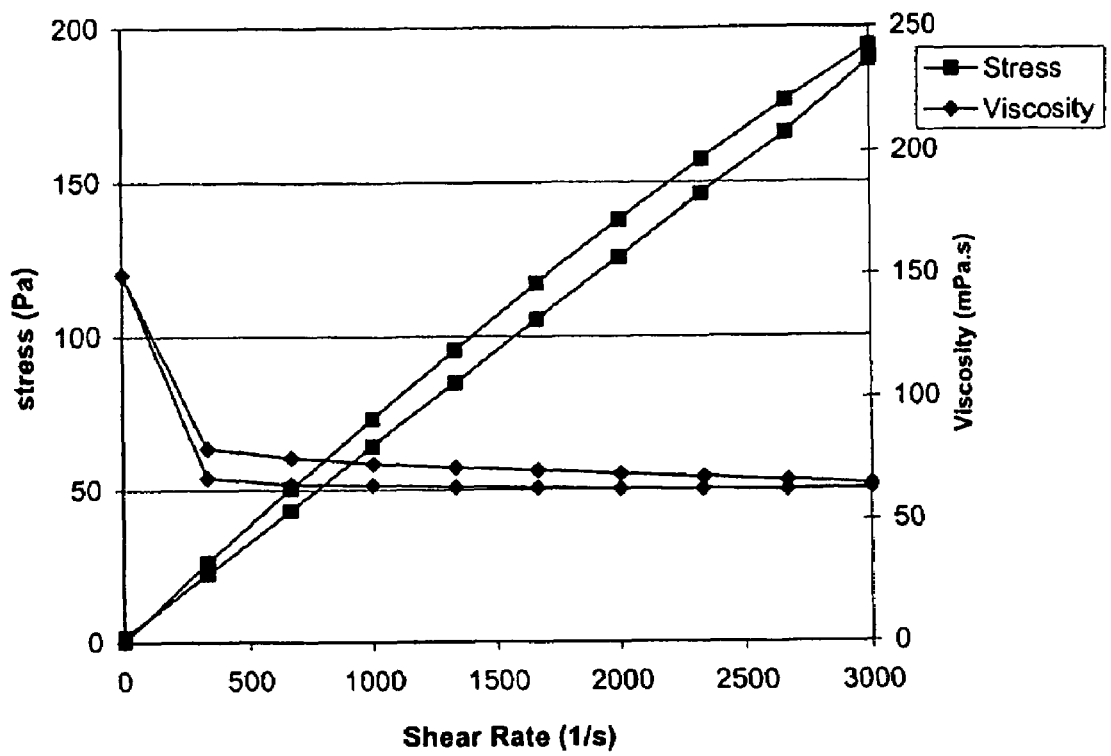
FIG. 9 is a graph illustrating the rheology of Example 3 after microwave treatment.

FIG. 7 of the attached drawings shows Example 3 before treatment, FIG. 8 shows Example 3 after convection treatment and FIG. 9 shows Example 3 after microwave treatment.

FIG. 7 illustrates that prior to the convection treatment, the toner was non-Newtonian and exhibited shear thinning, with a high shear viscosity of 68.4 mPas. FIG. 8 illustrates the same toner after the convection treatment. It now exhibits a significant reduction in non-Newtonian flow behaviour or yield viscosity, with a high shear viscosity of 64.4 mPas. FIG. 9 illustrates the same toner after microwave heat treatment. It now also exhibits a significant reduction in non-Newtonian behaviour or yield viscosity, with a high shear viscosity of 64.7 mPa·s.

Figure 10:
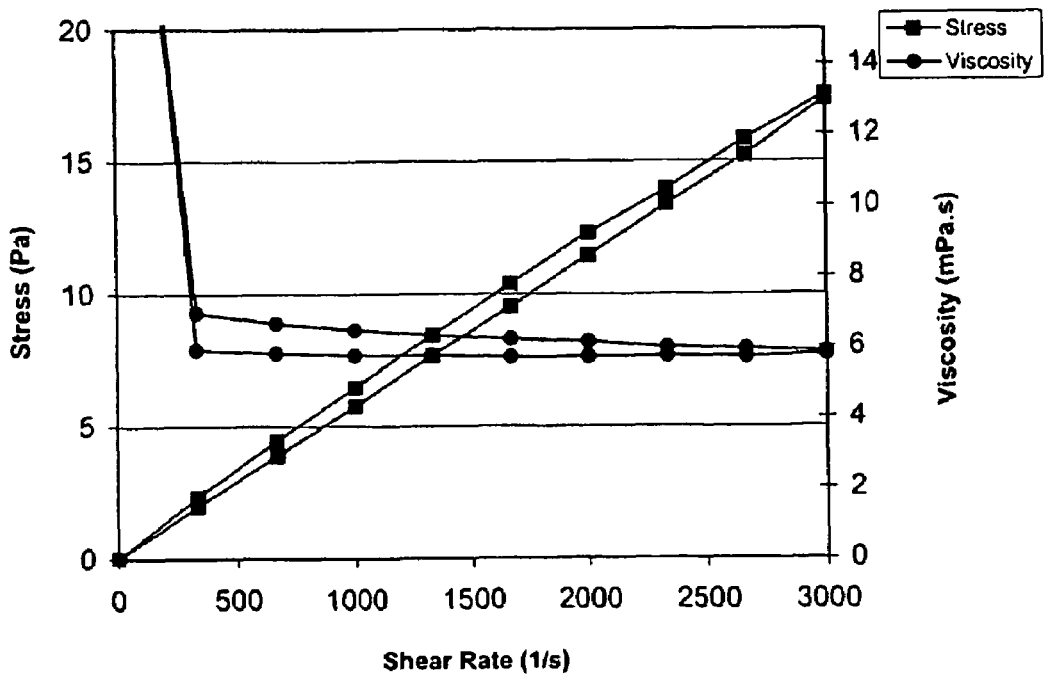
FIG. 10 is a graph illustrating the rheology of Example 4 with no treatment.
Figure 11:
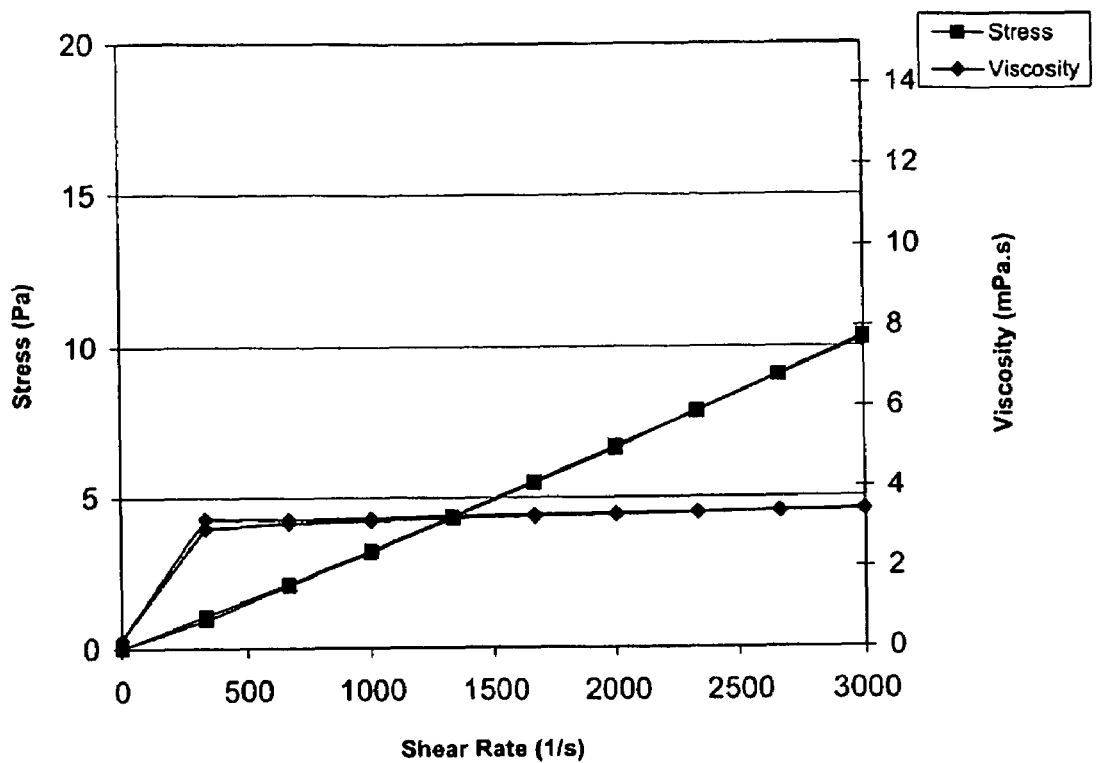
FIG. 11 is a graph illustrating the rheology of Example 4 after convection treatment.
Figure 12:
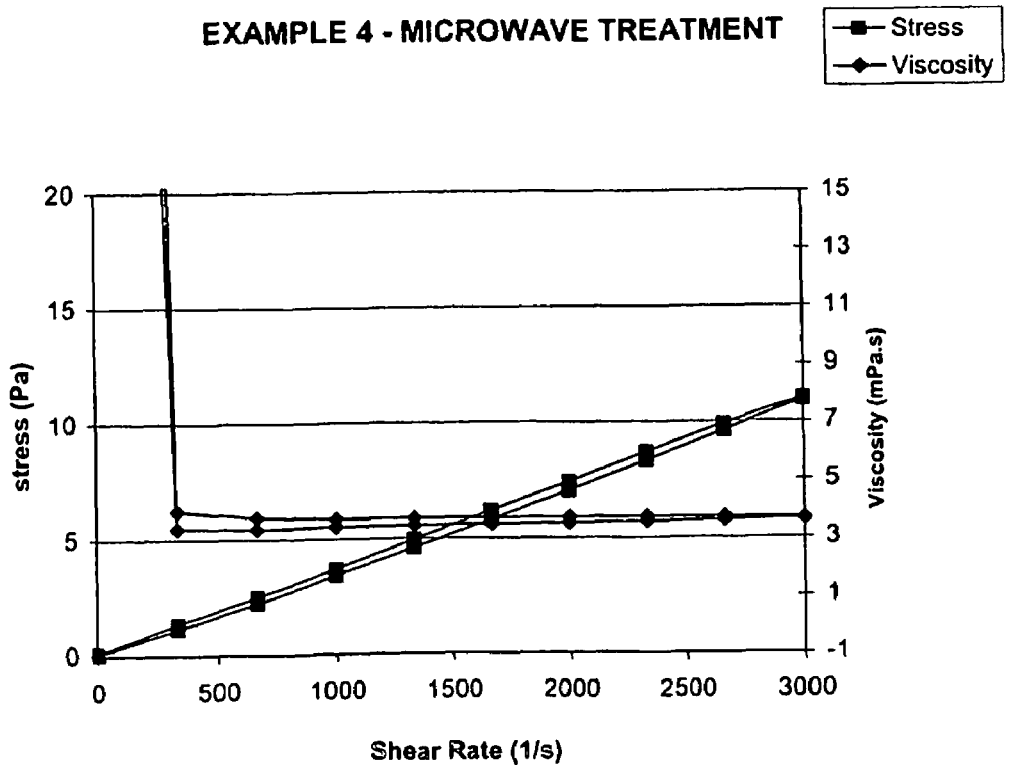
FIG. 12 is a graph illustrating the rheology of Example 4 after microwave treatment.

FIG. 10 of the attached drawings shows Example 4 before treatment, FIG. 11 shows Example 4 after convection treatment and FIG. 12 shows Example 4 after microwave treatment.

FIG. 10 illustrates that prior to the convection treatment, the ink was non-Newtonian and exhibited shear thinning, with a high shear viscosity of 5.84 mPa·s. FIG. 11 illustrates the same ink after the convection treatment. It now exhibits a significant reduction in non-Newtonian flow behaviour or yield viscosity, with a high shear viscosity of 3.42 mPa·s. FIG. 12 illustrates the same ink after microwave heat treatment. It now also exhibits a significant reduction in non-Newtonian behaviour or yield viscosity, with a high shear viscosity of 3.67 mPa·s.

Figure 13:
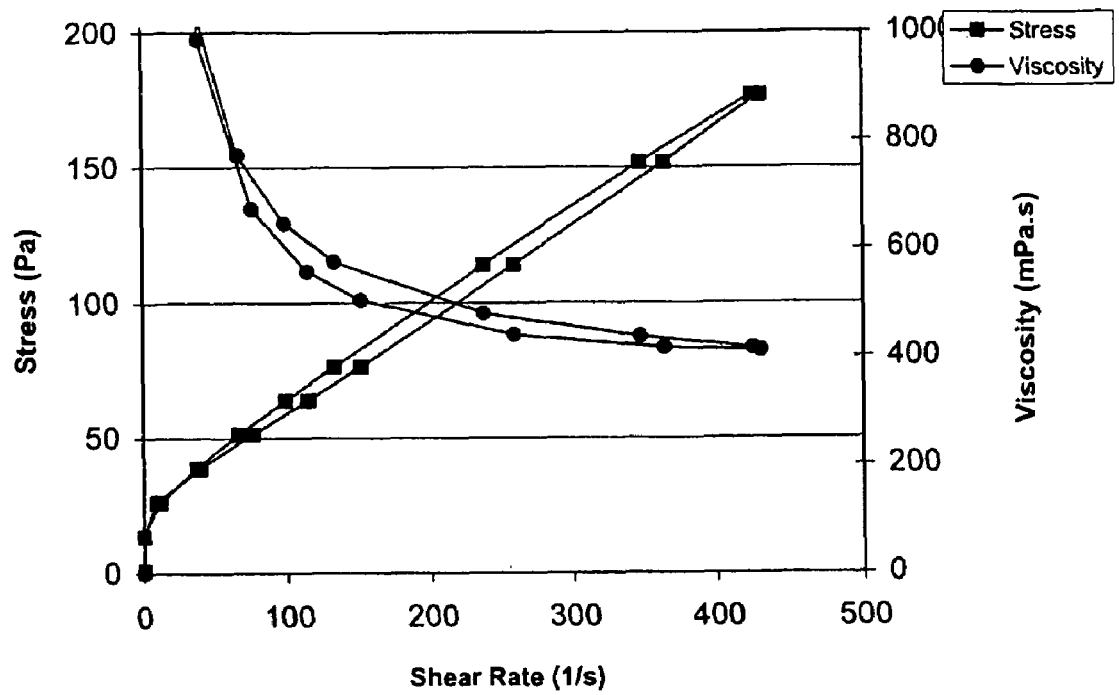
FIG. 13 is a graph illustrating the rheology of Example 5 with no treatment.
Figure 14:
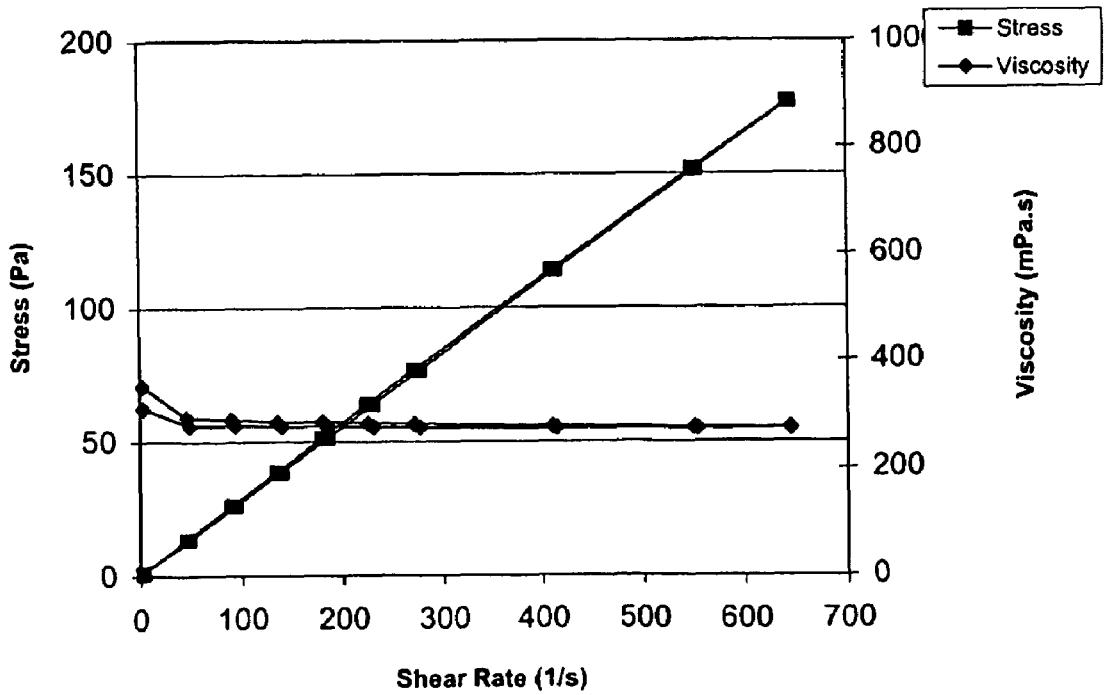
FIG. 14 is a graph illustrating the rheology of Example 5 after convection treatment.
Figure 15:
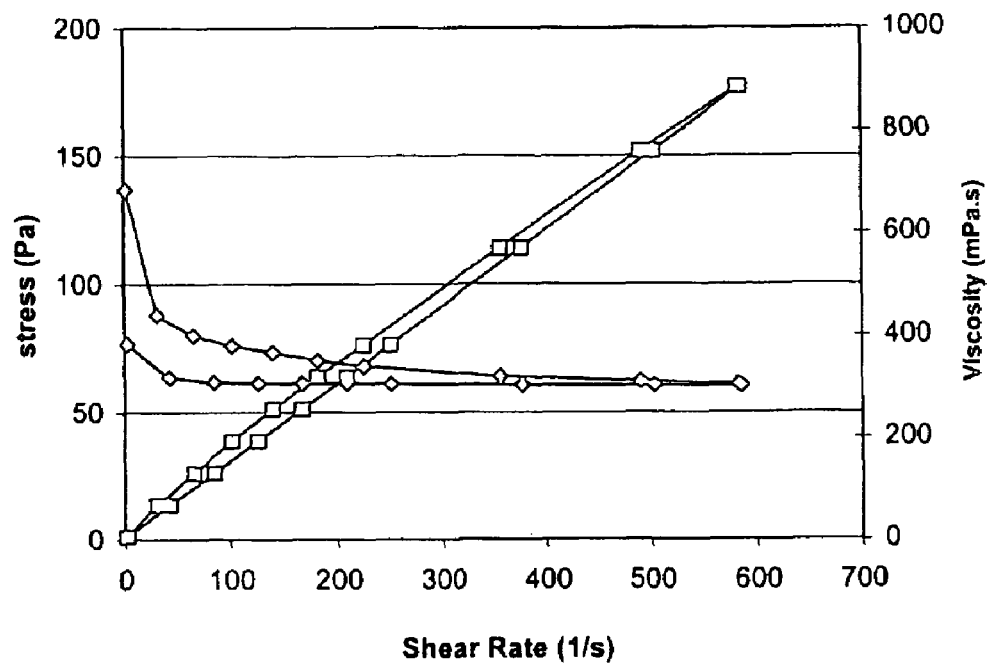
FIG. 15 is a graph illustrating the rheology of Example 5 after microwave treatment.

FIG. 13 of the attached drawings shows Example 5 before treatment, FIG. 14 shows Example 5 after convection treatment and FIG. 15 shows Example 5 after microwave treatment.

FIG. 13 illustrates that prior to the convection treatment, the toner was non-Newtonian and exhibited shear thinning, with a high shear viscosity of 415 mPa·s. FIG. 14 illustrates the same toner after the convection treatment. It now exhibits a significant reduction in non-Newtonian flow behaviour or yield viscosity, with a high shear viscosity of 275 mPa·s. FIG. 15 illustrates the same toner after microwave heat treatment. It now also exhibits a significant reduction in non-Newtonian behaviour or yield viscosity, with a high shear viscosity of 304 mPa·s.

Dispersion Stability

All the Examples were examined before and after treatment for dispersion stability by assessment of agglomeration and sedimentation over a specified time period. Sedimentation was assessed by samples being placed in a volumetrically graduated sedimentation flask and the percent of sedimentation analysed after a defined time period; the amount of decrease in the meniscus represents the separated (sedimented) solids compared to the original meniscus volume. Agglomeration was assessed by samples being placed in a beaker for a specified period of time and then assessed by stirring samples gently. The agglomeration level can be determined by the sample's resistance to stirring.

It was found that over a 6 month storage period, dispersion stability had been greatly improved with the treated samples, as can be seen in the following results:

|  | Sedimentation | Agglomeration |
|---|---|---|
| Example 1 | | |
| No treatment | >31% | moderate |
| Convection Treatment | <4% | none |
| Microwave Treatment | <5% | none |
| Example 2 | | |
| No treatment | >22% | moderate |
| Convection Treatment | <2% | none |
| Microwave Treatment | <3% | none |
| Example 3 | | |
| No treatment | >28% | moderate |
| Convection Treatment | <3% | none |
| Microwave Treatment | <3% | none |
| Example 4 | | |
| No treatment | >50% | moderate |
| Convection Treatment | <10% | none |
| Microwave Treatment | <15% | minor |
| Example 5 | | |
| No treatment | >25% | moderate |
| Convection Treatment | <3% | none |
| Microwave Treatment | <5% | none |

Electrical Characteristics

It is well known that the electrical properties of liquid toners and electrostatic ink jet inks significantly influence the quality of a printed image; the most important electrical characteristics of conventional marking liquids are known to be conductivity, electrophoretic mobility and zeta-potential. Measurement of these as well as other electrical characteristics of the Examples both prior to and post treatment show improved characteristics which are reflected in the improved toner performance in respective imaging systems. The electrical characteristics of the marking liquids were measured using a toner characterization cell as disclosed in U.S. Pat. No. 6,613,209 to Ozerov.

Results were as follows:

|  | No Treatment | Convection Treatment | Microwave Treatment |
|---|---|---|---|
| Example 1 | | | |
| Mobility ($m^2V^{-1}s^{-1}$) | $7.0 \times 10^{-11}$ | $2.4 \times 10^{-10}$ | $2.7 \times 10^{-10}$ |
| Conductivity (pS/cm) | 313.8 | 389.5 | 395.2 |
| Zeta Potential (mV) | 42 | 145 | 163 |
| Example 2 | | | |
| Mobility ($m^2V^{-1}s^{-1}$) | $1.8 \times 10^{-11}$ | $6.0 \times 10^{-11}$ | $6.8 \times 10^{-11}$ |
| Conductivity (pS/cm) | 0.23 | 22.7 | 24.2 |
| Zeta Potential (mV) | 53 | 180 | 203 |
| Example 3 | | | |
| Mobility ($m^2V^{-1}s^{-1}$) | $5.7 \times 10^{-11}$ | $1.7 \times 10^{-10}$ | $1.9 \times 10^{-10}$ |
| Conductivity (pS/cm) | 0.06 | 10.0 | 10.9 |
| Zeta Potential (mV) | 68 | 204 | 228 |
| Example 4 | | | |
| Mobility ($m^2V^{-1}s^{-1}$) | $2.5 \times 10^{-10}$ | $8.1 \times 10^{-10}$ | $6.1 \times 10^{-10}$ |
| Conductivity (pS/cm) | 407 | 1974 | 1852 |
| Zeta Potential (mV) | 17 | 55 | 41 |
| Example 5 | | | |
| Mobility ($m^2V^{-1}s^{-1}$) | $4.4 \times 10^{-12}$ | $1.5 \times 10^{-11}$ | $1.7 \times 10^{-11}$ |
| Conductivity (pS/cm) | 0.07 | 8.2 | 7.6 |
| Zeta Potential (mV) | 52 | 179 | 201 |

Print Testing

The samples were tested for image optical density and background staining using an electrostatic printer of the type generally disclosed in U.S. Pat. No. 6,167,225 to Sasaki et al. Print samples for Example 4 were tested for optical density and background staining using an ink jet printer of the type generally disclosed in U.S. Pat. No. 6,260,954 to Lima-Marques. Image density and background staining measurements were taken using a Gretag D186 Densitometer made by Gretag, Switzerland.

The results were as follows:

|  | No Treatment | Convection Treatment | Microwave Treatment |
|---|---|---|---|
| Example 1 | | | |
| Image (ODU) | 1.25 | 1.85 | 1.76 |
| Background (ODU) | 0.07 | 0.00 | 0.00 |
| Example 2 | | | |
| Image (ODU) | 1.32 | 2.02 | 1.96 |
| Background (ODU) | 0.04 | 0.00 | 0.00 |
| Example 3 | | | |
| Image (ODU) | 1.22 | 1.73 | 1.72 |
| Background (ODU) | 0.08 | 0.00 | 0.00 |
| Example 4 | | | |
| Image (ODU) | 1.42 | 1.79 | 1.71 |
| Background (ODU) | 0.03 | 0.00 | 0.00 |
| Example 5 | | | |
| Image (ODU) | 1.30 | 1.65 | 1.59 |
| Background (ODU) | 0.00 | 0.00 | 0.00 |

As can be seen from the above results, treatment resulted in significantly increased optical density in print sample image areas, as well as decreased or no staining or background scatter in non-image areas.

There has been hereto described a novel method of preparation of marking liquids exhibiting substantially improved imaging performance, including physical as well as electrical stability. The instant invention also describes a method by which prior art electrostatic marking liquids with a compatible resin system can be substantially enhanced in imaging performance, including physical as well as electrical stability by application of the present invention.

It can be appreciated that changes to any of the above embodiments can be made without departing from the scope of the present invention and that other variations can be made by those skilled in the art without departing from the invention as defined in the appended claims.

The claims defining the invention are as follows:

1. A method of preparation of a liquid electrostatographic toner or liquid ink jet ink, the method including the steps of, a) preparing a resin system comprising a resin or resins with optionally a colourant and coarse grinding the resin system, b) milling the coarse ground resin system with a carrier liquid to produce a liquid marking particle mix, c) heating the liquid marking particle mix to a temperature about or greater than the first softening point of the resin system of the marking particle mix and less than about the second softening point of the resin system, d) maintaining the temperature of the heated marking particle mix for a selected period of time, e) cooling the marking particle mix to room temperature, and f) mixing the marking particle mix with high shear.

2. A method as in claim 1 wherein the selected period of time is from several minutes to several days depending upon the type of heating applied and the method of applying that heat.

3. A method as in claim 1 wherein the heating is provided by convection, conduction or radiation.

4. A method as in claim 1 wherein the resin system optionally comprises a plasticiser.

5. A method as in claim 4 wherein the plasticiser is selected from the group comprising sulfonamides, adipates, sebacates and phthalates.

6. A method as in claim 4 wherein the resin system comprises: 0 to 60 percent of colourant, 0 to 20 percent of plasticisers, and resin or resins to 100 percent.

7. A method as in claim 6 wherein the colourant is present in the range of about 1 to about 60 percent by weight of the toner or ink.

8. A method as in claim 1 wherein the step of milling the resin system includes milling with additives selected from one or both of the group comprising charge control agents and dispersion agents.

9. A method as in claim 8 wherein the charge control agent is selected from the group comprising metallic soaps, fatty acids, lecithin, organic phosphorus compounds, succinimides and sulphosuccinates.

10. A method as in claim 8 wherein the charge control agent is present in the range of 0.01 to 5 percent by weight of the toner or ink when used.

11. A method as in claim 8 wherein the dispersion agent is selected from the group comprising polymeric hyperdispersants, amino-silicones, polymeric petroleum additives, polymeric oil additives and multi-functional pigment dispersing agents.

12. A method as in claim 8 wherein the dispersion agent is present in the range of about 0.1 to about 20 percent by weight of the toner when used.

13. A method as in claim 12 wherein the heating is provided by convection, conduction or radiation.

14. A method as in claim 1 wherein the resin is selected from one or more of the group comprising ethyl cellulose, oil modified alkyd resin, acrylic ester resin, methacrylic ester resin, polystyrene, silicone-acryl copolymer, silicone resin, silicone-(meth)acryl copolymer, block polymer or graft polymer, polyolefin copolymer, poly(vinyl chloride) resin, chlorinated polypropylene, polyamide resin, coumarone-indene resin, rosin-modified resin, alkylphenol-modified xylene resin, synthetic polyesters; polypropylene or modified polypropylene; alkylated poly vinyl pyrrolidones; natural waxes, montan wax, candelilla wax, sugar cane wax, beeswax; natural resins, ester gum and hardened rosin; natural-resin-modified cured resins, natural resin-modified maleic acid resins, natural resin-modified phenol resins, natural resin-modified polyester resins, natural resin-modified pentaerythritol resins and epoxy resins.

15. A method as in claim 1 wherein the colourant is selected from one or more of inorganic pigments selected from carbon blacks, silica, alumina, titanium dioxide, magnetic iron oxide, or organic pigments selected from phthalocyanine blue, alkali and reflex blue, phthalocyanine green, diarylide yellow, arylamide yellow, azo and diazo yellow, azo red, rubine toner, quinacridone red, basic dye complexes, lake red, or fluorescent pigments and dyestuffs selected from basic dyes and spirit soluble dyes or combinations thereof.

16. A method as in claim 1 wherein the carrier liquid is selected from the group comprising isoparaffinic-hydrocarbons, silicone fluids of straight chained configuration, silicone fluids of cyclic configuration, silicone fluid of branched configuration, vegetable oils, synthetic oils or polybutenes or blends thereof.

17. A method of preparation of a liquid electrostatographic toner or liquid ink jet ink, the method including the steps of, a) heating a marking particle mix including a carrier liquid and a resin which is insoluble in the carrier liquid to a temperature at or about the first softening point of the resin of the marking particle mix to less than about the second softening point of the resin, b) maintaining the temperature of the heated marking particle mix for a selected period of time, c) cooling the marking particle mix to room temperature, and d) mixing the marking particle mix with high shear.

18. A method as in claim 17 wherein the selected period of time is from several minutes to several days depending upon the type of heating applied and the method of applying that heat.

19. A method of improving the rheology of a liquid electrostatographic toner or liquid ink jet ink including the steps of heating a marking particle mix of particles of a resin and a colourant blend in a carrier liquid to a temperature between about the first softening point of the resin to less than about the second softening point of the resin, maintaining the temperature of the heated marking particle mix for a selected period of time, cooling the marking particle mix to room temperature, and mixing the marking particle mix with high shear.

20. A method of improving the physical and electrical properties of a liquid electrostatographic toner, the toner comprising particles of a resin and a colourant in a carrier liquid, the method including the steps of heating the toner to a temperature between about the first softening point of the resin to less than about the second softening point of the resin, maintaining the temperature of the toner for a selected period of time, cooling the toner to room temperature, and mixing the toner with high shear.

* * * * *